United States Patent

[11] 3,550,949

| [72] | Inventor | Michel Bonnaud<br>Montebeliard, France |
|---|---|---|
| [21] | Appl. No. | 743,710 |
| [22] | Filed | July 10, 1968 |
| [45] | Patented | Dec. 29, 1970 |
| [73] | Assignees | Automobiles Peugeot<br>Paris, France;<br>Regie Nationale Des Usines Renault<br>Billancourt, France |
| [32] | Priority | July 21, 1967 |
| [33] | | France |
| [31] | | No. 115,137 |

[54] SUPPORTING, PIVOTING AND LOCKING DEVICE FOR A CONVERTIBLE SEAT OF A VEHICLE
8 Claims, 8 Drawing Figs.

[52] U.S. Cl.................................................. 296/69,
297/63, 297/357, 297/379
[51] Int. Cl......................................................... B60n 1/10
[50] Field of Search........................................... 296/66, 69;
297/357, 62, 63, 92; 5/43

[56] References Cited
UNITED STATES PATENTS

| 1,695,871 | 12/1928 | Walker et al. | 297/357 |
| 2,997,335 | 8/1961 | May | 296/66 |
| 3,001,820 | 12/1961 | Morphew | 296/66 |

Primary Examiner—Banjamin Hersh
Assistant Examiner—John A. Pexan
Attorney—Burns Doane and Benedict and Swecker and Mathis

ABSTRACT: Device for connecting a convertible seat assembly to a floor. The assembly comprises two parts foldable to positions in which a first part constitutes an extension of the floor and the second part an abutment face. The device comprises a plane element carrying said first part, a raising device for the element, and retaining means for maintaining it in an inclined position. When the raising device is actuated in one direction, said element is raised to a position in which it is disengaged from the retaining means and can be folded forwardly to the position in which said first part extends the floor.

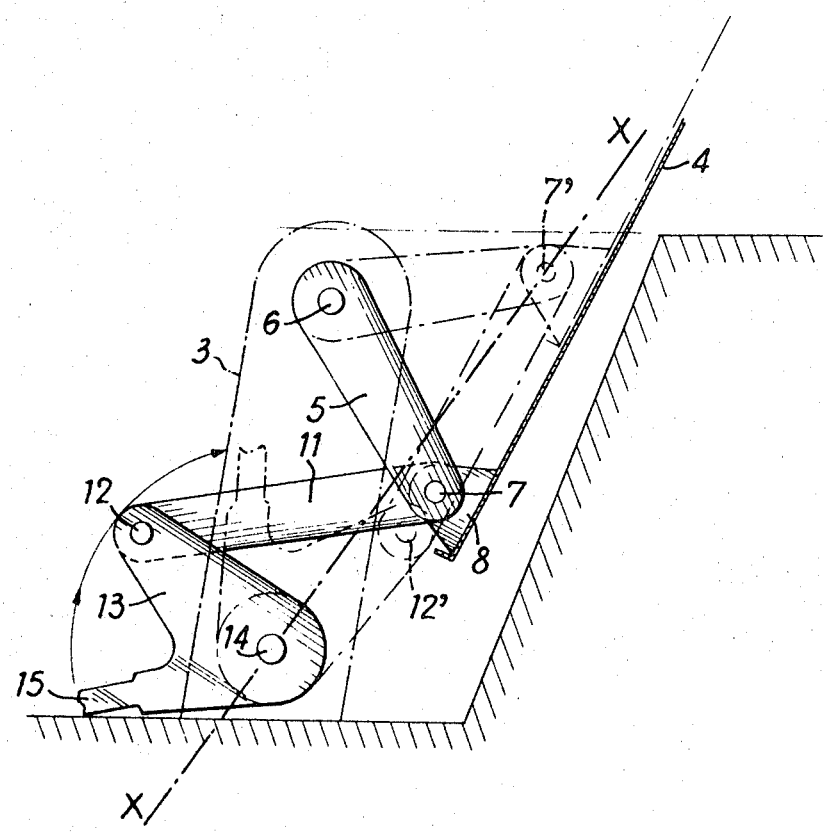

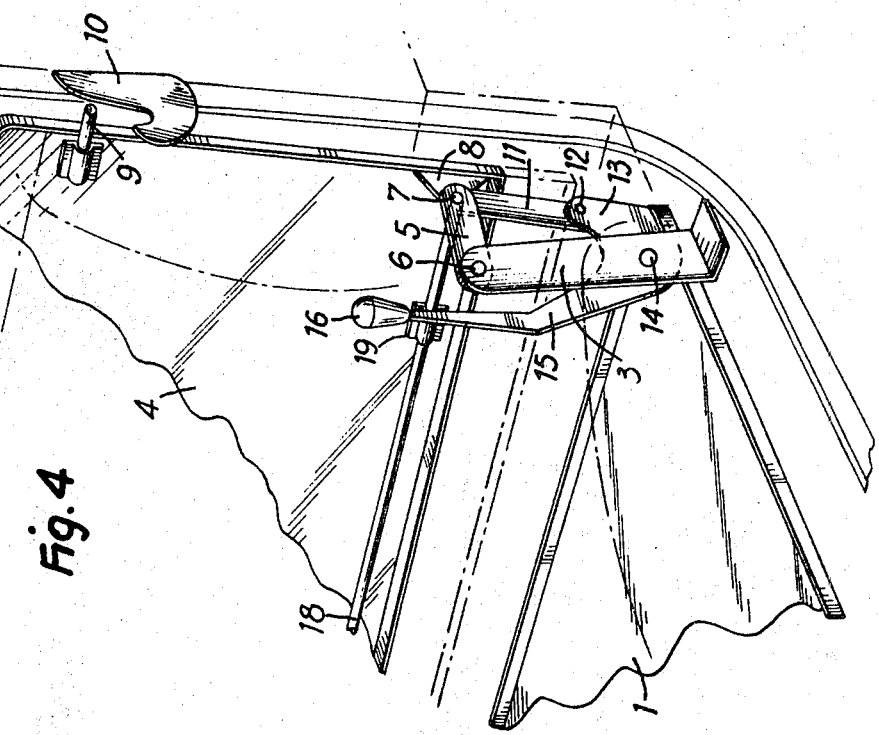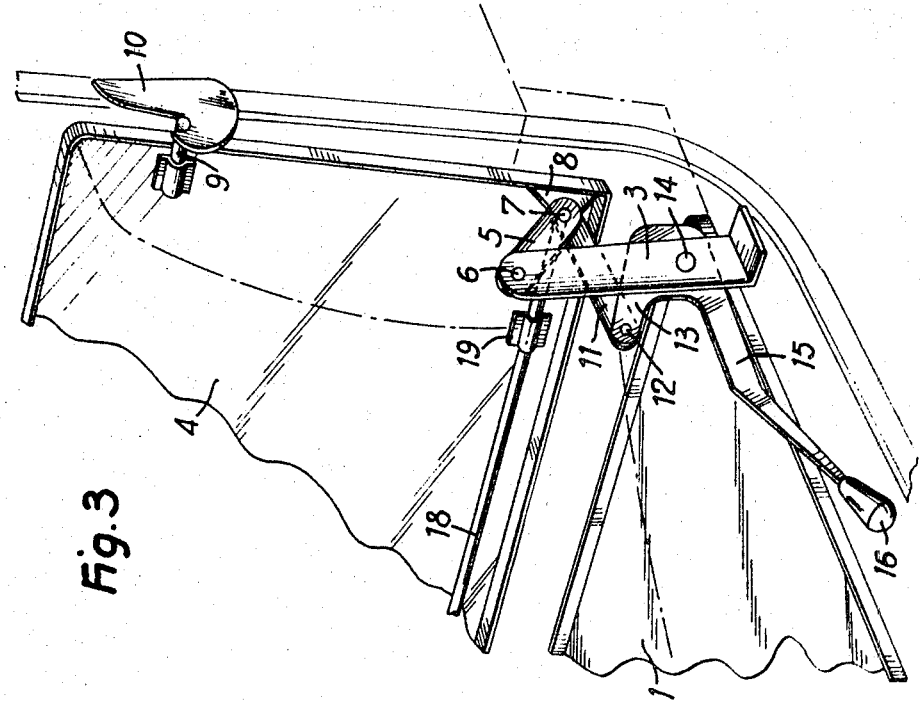

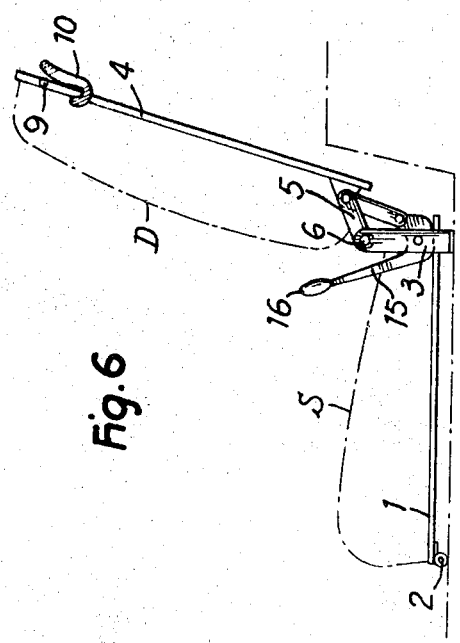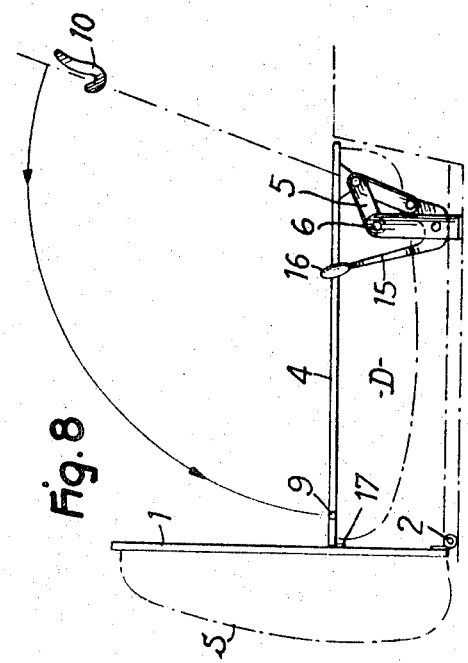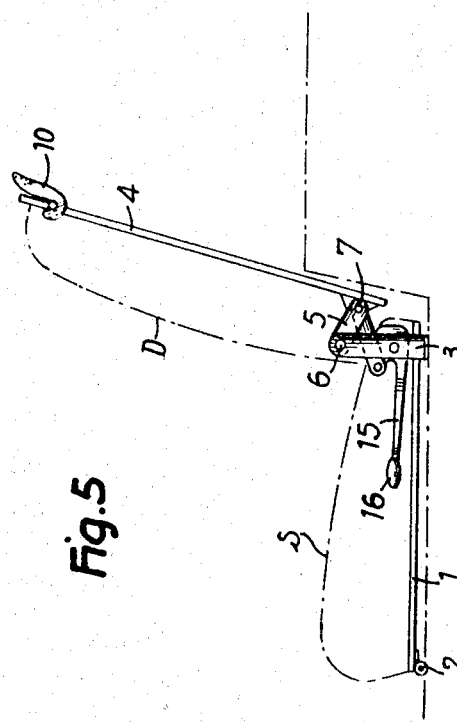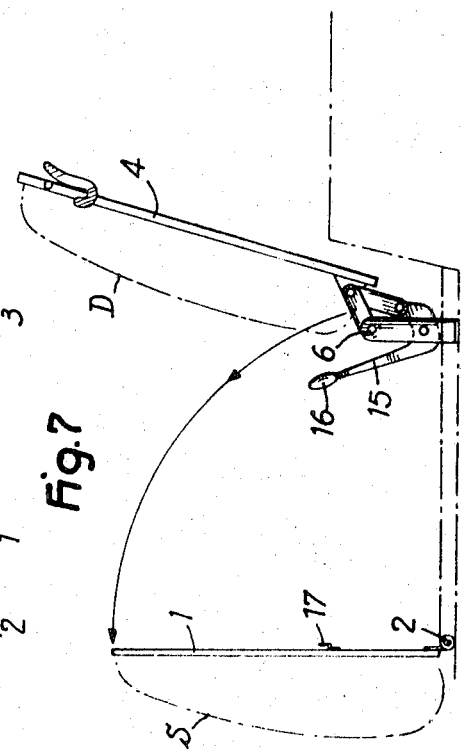

SUPPORTING, PIVOTING AND LOCKING DEVICE FOR A CONVERTIBLE SEAT OF A VEHICLE

The present invention relates to seat assemblies for vehicles of the type consisting of a convertible seat comprising two foldable elements which are such that, in one position, one of these elements serves as an inclined support for a backrest cushion and the other element serves as a support for the seat proper, whereas in the other position, the first element forms an extension of the floor of the vehicle and the second element is raised and constitutes an abutment for luggage carried by this extension.

Known assemblies of this type are employed in vehicles of the "break" type in which the backrest of the rear seat, when it is folded forwardly to a horizontal position, constitutes a loading platform which is on the same level as the part of the floor located at the rear of this seat, the latter being located lower down.

Many locking devices exist for convertible seat assemblies of this type. These devices must perform the following functions:

permit the obtainment of desired initial and final positions (with as little limitation as possible);
positively lock the elements of the seat in these positions (back rest and seat proper);
allow movement so that the seat can afford maximum comfort;
afford a solid and reliable abutment face for the located merchandise in the event of sudden deceleration of the vehicle.

Mechanisms employed up to the present time have not been entirely satisfactory, in particular as concerns the locking, which is often ineffective or insufficient, the control, and the paths of movement which in most cases necessitate modifications in the shape of the seats which are incompatible with the comfort.

The object of the invention is to provide a supporting, pivoting and locking device for a convertible seat of the aforementioned type, said device comprising, in combination with a plane element forming the part of the seat intended to support the cushion of the backrest and form the extension of the floor, at least one raising device for said element, and retaining means for maintaining said element in an inclined position, the arrangement being such that when the raising device is actuated in one direction said element is raised to a raised position which is such that it is disengaged from said retaining means and can be folded forwardly to the floor position.

Another object of the invention is to provide a convertible seat comprising the aforementioned device.

Preferably, the seat proper has such rearward extent that, in its normal position of utilization, it extends rearwardly under the backrest the locking raising of which at the same time disengages the seat proper for swinging it over forwardly.

Further features and advantages of the invention will be apparent from the ensuing description with reference to the accompanying drawings.

In the drawings:

FIG. 2 is a diagram showing the principle of operation of the raising device by means of which the part of the seat capable of forming the support of the backrest or the extension of the floor is pivotably mounted and lockable;

FIG. 3 is a partial perspective view of the seat assembly showing the raising device in the "seat" position of the assembly;

FIG. 4 is a view similar to FIG. 3 showing the cushion support of the backrest in its raised position after actuation of the raising device; and FIGS. 5—8 show different stages in the conversion of the seat assembly.

Figure 1:
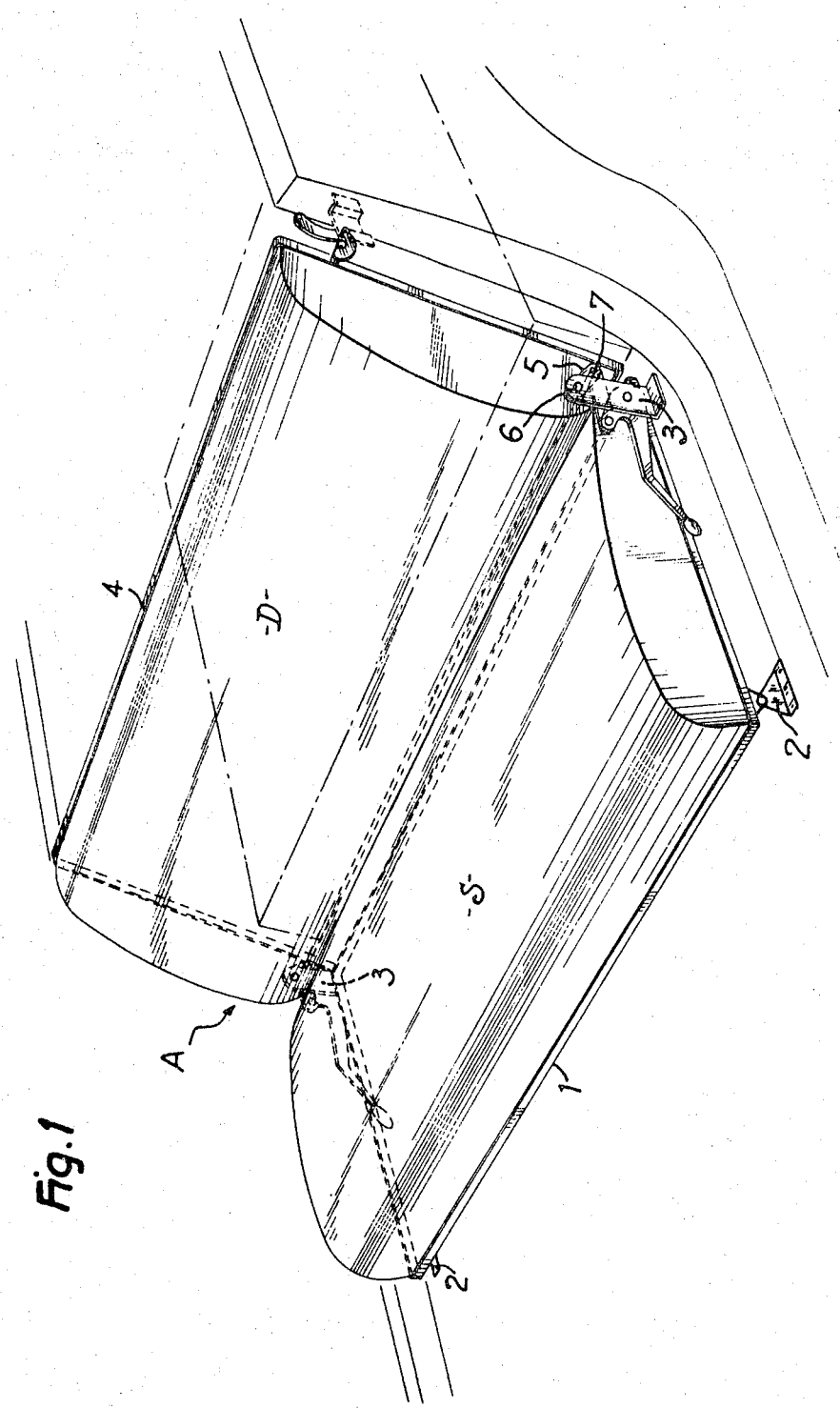
FIG. 1 is a perspective view of a convertible seat assembly for a vehicle shown in the position in which it can be used as a seat.

With reference to the drawings, the convertible seat assembly is mounted in the known manner in a part of the floor of the vehicle on a level which is lower than the level of the rear part of the usual loading floor.

According to the illustrated embodiment, the seat assembly A comprises a first plane rigid element 1 which is pivoted at its forward edge on two supports 2, integral with the floor of the vehicle, and extends rearwardly between two roughly vertical members 3 which are also integral with the floor, and a second plane rigid element 4 which extends obliquely upwardly from a point located slightly to the rear of the members 3.

The plane elements 1 and 4 carry padding or a cushion S and D respectively.

The element 4 is connected, in the vicinity of its lower edge, to the upper part of the members 3 and, furthermore, in a detachable manner, in the vicinity of its upper edge, to lateral uprights or pillars of the body of the vehicle.

As the arrangement is similar on both sides of the seat assembly A, only one of these devices will be described hereinafter.

The lower edge of the element 4 is connected to the upper part of the member 3 by means of a link 5 which is pivoted, at one end, on a pin 6 in the vicinity of the upper part of the member 3 and, at its other end, on a pin 7 carried by a member 8 integral with the element 4.

The upper edge of the element 4 is detachably connected to the lateral pillars of the body by pins 9 which extend beyond the lateral edge of the element 4 into supports 10 having the shape of upwardly-open hooks fixed to the lateral pillars of the body of the vehicle.

It will be understood that, by means of this arrangement, the element 4 of the seat assembly is suspended and retained by the pins 9 which rest in the supports 10 and that this element 4, owing to its pivotal connection to the members 3, can be raised so as to withdraw the ends of the pins 9 from the hook supports 10 so that the upper part of the element 4 is released, which allows the element 4 to be pivoted forwardly about its pivotal connection to the member 3.

It will be observed that the plane element 1 of the seat assembly which, when in its horizontal position, extends between the members 3 under the lower edge of the plane element 4, is disengaged when the element 4 is brought to its raised position in which the pins 9 are disengaged from the supports 10, this raised position being limited by the movement of the links 5.

To raise the element 4 of the seat, there is provided on each of the members 3 an identical raising toggle joint.

This raising toggle joint comprises a first branch in the form of a link 11 one of the ends of which is pivoted on the pin 7 of the link 5 whereas the other end is pivoted by a pin 12 to the second branch of the toggle consisting of an arm 13 which is itself pivoted on a fixed pin 14 which is integral with the member 3 and located below the pin 6.

The arm 13 constituting the second branch of the toggle joint comprises, in one piece therewith, an actuating lever which extends forwardly alongside the plane element 1 and terminates in a knob 16.

The arrangement of the toggle joint is such that, when the element 1 of the assembly A is in its lower position, that is, the position in which it is suspended by the pins 9 in the supports 10, the lever 11 of the toggle joint extends forwardly in the direction away from the links 5 and in the same direction as the actuating lever 15, as shown in full line in FIG. 2.

When the lever 15 is shifted upwardly from this position so as to bring it to the position shown in FIGS. 4 and 6 (and in dot-dash line in FIG. 2), the arm 13 is supported by the fixed pins 14 and 6 and raises the element 4, the pin 7 describing an arc of a circle having its center on the pin 6.

The toggle joint therefore moves through a dead center position in which the pins 14, 12 and 7 are in a straight line and in which the element 1 reaches its uppermost position, the pins 9 being then amply disengaged from the supports 10.

If the lever 15 is shifted still further upwardly, the pin 12 passes through a line intersecting the pins 14 and 7, the branches 13 and 11 of the toggle joint being at a wide open obtuse angle.

In shifting the lever 15 still further, the pin 12 pursues its movement, which is facilitated by the action of gravity of the element 1, until this movement is stopped, for example by an abutment which in the illustrated embodiment can be formed by giving the lever 15 a slightly outwardly cranked shape so that it abuts the front edge of the member 3. Further, this shape of the lever 15 moves the knobs 16 away from the edge of the element 1 and thus facilitates the grasping of this knob.

In the course of this movement, the element 4 descends slightly. However, this movement is insufficient to engage the pins 9 in the supports 10 so that they remain disengaged from the latter and the pins 12 and 7 take up the positions 12' and 7' (FIG. 2).

It will be understood that this position is irreversible so long as the lever 15 is not once again shifted in the opposite direction for bringing the toggle joint 13, 11, and consequently the element 4 back to their initial positions.

Subsequently, as the plane element 1 is disengaged from the lower edge of the element 4, it can be pivoted forwardly to the vertical position shown in FIG. 7.

The plane element 4 can then also be pivoted forwardly to its horizontal position shown in FIG. 8.

It will be understood that the height of the members 3 is such that, in the horizontal position of the element 4, this element is on the same level as the rear part of the floor. It will be observed that, in this position, any load supported by the element 4 tends to shift the pin 12 away from the line X-X (FIG. 2) intersecting the pin 14 and the pin 7 in its position 7' and consequently maintains the toggle joint in its irreversible position.

Preferably, an abutment 17 is provided on the element 1 on which the edge of the element 4 comes to bear.

It is also advantageous to interconnect the pins 7 on each side of the assembly. For this purpose, there is provided a rod 18 attached to the element 4 by members 19 and whose ends constitute the two pins 7. In this way, the device is rendered stiffer and can be actuated indifferently on either side of the seat assembly A.

It will be observed that when the assembly A is in the position in which the element 1 forms the seat proper, and the element 4 forms both the backrest and an abutment face for packages disposed at the rear thereof, any thrust exerted on this element 4 by the packages for example in the event of a sudden deceleration, is converted into a couple tending to lower the element 4. Consequently, the pins 9 are applied in the supports 10 with an increased force and this precludes any shifting of the backrest 4 of the seat assembly.

Although a specific embodiment of the invention has been described, many modifications and changes may be made therein without departing from the scope of the invention.

I claim:

1. A device for connecting a convertible seat assembly to a vehicle body having a floor, said seat assembly having a seat portion and a back portion foldable from respective normal positions in which they constitute a seat, to respective folded positions in which the back portion constitutes an extension of the floor and the seat portion constitutes an abutment face, said device comprising disengageable retaining means on the vehicle body and on the back portion of the seat respectively for maintaining said back portion in its normal position, a member fixed with respect to the vehicle body and located adjacent the floor of the vehicle, a toggle joint interconnecting said fixed member and said back portion of the seat and having a first link pivoted to said fixed member and a second link pivoted to said back portion of the seat, and an actuating lever integral with said first link, for pivoting the same and thereby open the toggle joint, raise said back portion of the seat and disengage said retaining means.

2. A device as claimed in claim 1, wherein the toggle joint has a fixed pin integral with said member and on which is pivoted said first link, two pins movable relative to said vehicle body, a first of said movable pins interconnecting said two links, and a second of said pins being fixed with respect to the lower part of said back portion and pivotally supporting the second of said links, said first link having integral therewith said actuating lever.

3. A device as claimed in claim 2, wherein upon operation of said actuating lever, the toggle joint is made to pass through its dead center position, abutment means being provided on said lever and said member respectively, for maintaining the toggle joint slightly beyond said dead center position.

4. A device as claimed in claim 1, comprising a third link connecting the lower part of said back portion to said member.

5. A device as claimed in claim 1, wherein said retaining means comprise a pin and a hook, one of the elements consisting of said hook and said pin of the retaining means being fixed relative to said vehicle body.

6. A device as claimed in claim 5, wherein said hook is fixed relative to said vehicle body and opens upwardly, and said pin is integral with said back portion of the seat assembly.

7. The combination of a convertible seat assembly for a floor of, in particular, a vehicle, and two devices for connecting said assembly to said floor, said assembly having a seat portion and a back portion foldable from respective normal positions in which they constitute a seat, to respective folded positions in which the back portion constitutes an extension of the floor and the seat portion constitutes an abutment face, each of said devices comprising in combination a plane element carrying the back portion of the seat assembly disengageable retaining means on the vehicle body and on said plane element for maintaining said plane element in its normal position, a member fixed with respect to the vehicle body, a toggle joint interconnecting said fixed member and said plane element and having a first link pivoted to said fixed member and a second link pivoted to said plane element of the seat, a third link interconnecting said fixed member and said plane element, and an actuating lever integral with said first link, for pivoting the same and thereby open the toggle joint, raise said plane element of the seat and disengage said retaining means, said two devices being respectively located on both sides of said assembly, and means rigidly interconnecting said two devices.

8. The combination of a convertible seat assembly for a floor of in particular a vehicle, and two devices for connecting said assembly to said floor, said assembly having a seat portion and a back portion foldable from respective normal positions in which they constitute a seat, to respective folded positions in which the back portion constitutes an extension of the floor and the seat portion constitutes an abutment face, each of said devices comprising in combination a plane element carrying the back portion of the seat assembly disengageable retaining means on the vehicle body and on said plane element for maintaining said plane element in its normal position, a member fixed with respect to the vehicle body, a toggle joint interconnecting said fixed member and said plane element and having a first link pivoted to said fixed member and a second link pivoted to said plane element of the seat, a third link interconnecting said fixed member and said plane element, and an actuating lever integral with said first link, said seat portion of said assembly extending rearwardly under said back portion of the assembly, when said seat and back portions are in their respective normal positions.